United States Patent [19]
Shibata

[11] Patent Number: 4,902,210
[45] Date of Patent: Feb. 20, 1990

[54] CONTINUOUS FLUIDIZED-BED GRANULATING APPARATUS

[75] Inventor: Takeo Shibata, Shizuoka, Japan

[73] Assignee: Kabushiki Kaisha Okawaraseisakusho, Haibaragun, Japan

[21] Appl. No.: 233,759

[22] Filed: Aug. 19, 1988

[30] Foreign Application Priority Data

Aug. 20, 1987 [JP] Japan .................. 62-205126

[51] Int. Cl.[4] ............................................. B29C 67/02
[52] U.S. Cl. .................................. 425/6; 264/9;
264/11; 264/40.2; 264/117; 264/DIG. 51;
425/143; 425/146; 425/222; 425/DIG. 20
[58] Field of Search ............... 425/6, 7, 10, 135, 145,
425/146, 149, 222, DIG. 20, 143; 241/34;
209/250; 264/9, 11, 13, 37, 117, 40.1, 40.2,
DIG. 51; 118/303, DIG. 5

[56] References Cited

U.S. PATENT DOCUMENTS

| | | | |
|---|---|---|---|
| 3,186,928 | 6/1965 | Keaton et al. | 264/117 |
| 3,195,958 | 7/1965 | Goins | 264/117 X |
| 3,748,103 | 7/1973 | Bean et al. | 264/117 X |
| 3,856,441 | 12/1974 | Suzukawa et al. | 425/7 |
| 3,880,968 | 4/1975 | Kaspar et al. | 264/37 |
| 3,931,377 | 1/1976 | Dollinger | 264/40.1 X |
| 4,251,475 | 2/1981 | Varrasso et al. | 264/117 X |
| 4,440,866 | 4/1984 | Lunghofer et al. | 264/117 X |
| 4,698,190 | 10/1987 | Shibata et al. | 425/222 X |

FOREIGN PATENT DOCUMENTS 61-138528  6/1986  Japan.

Primary Examiner—Richard L. Chiesa
Attorney, Agent, or Firm—Fleit, Jacobson, Cohn, Price, Holman & Stern

[57] ABSTRACT

In a fluidized-bed granulating apparatus for continuously producing granular particles from a powdered raw material, while a granulated product is continuously exhausted in a substantially constant amount from the bottom or bottom side wall of a fluidizing chamber and is introduced into a classifying section where the granulated product is classified by classifying means thereby selecting and delivering the granules granulated to particle size greater than the desired size and returning ungranulated material to the fluidizing chamber, the pressure drop of the fluidized bed is detected to adjust the charging rate of the powdered raw material into the fluidized bed and the moisture content of the material to be granulated in the bed is detected to adjust the feed rate of a binding liquid, thereby producing a granulated product of a desired particle size. Also, the amount of heat supplied to the fluidized bed is adjusted in accordance with the integration ratio between the charging rate of the powdered raw material and the feed rate of the binding liquid (liquid/powder ratio), thereby setting a liquid/powder ratio freely.

5 Claims, 2 Drawing Sheets

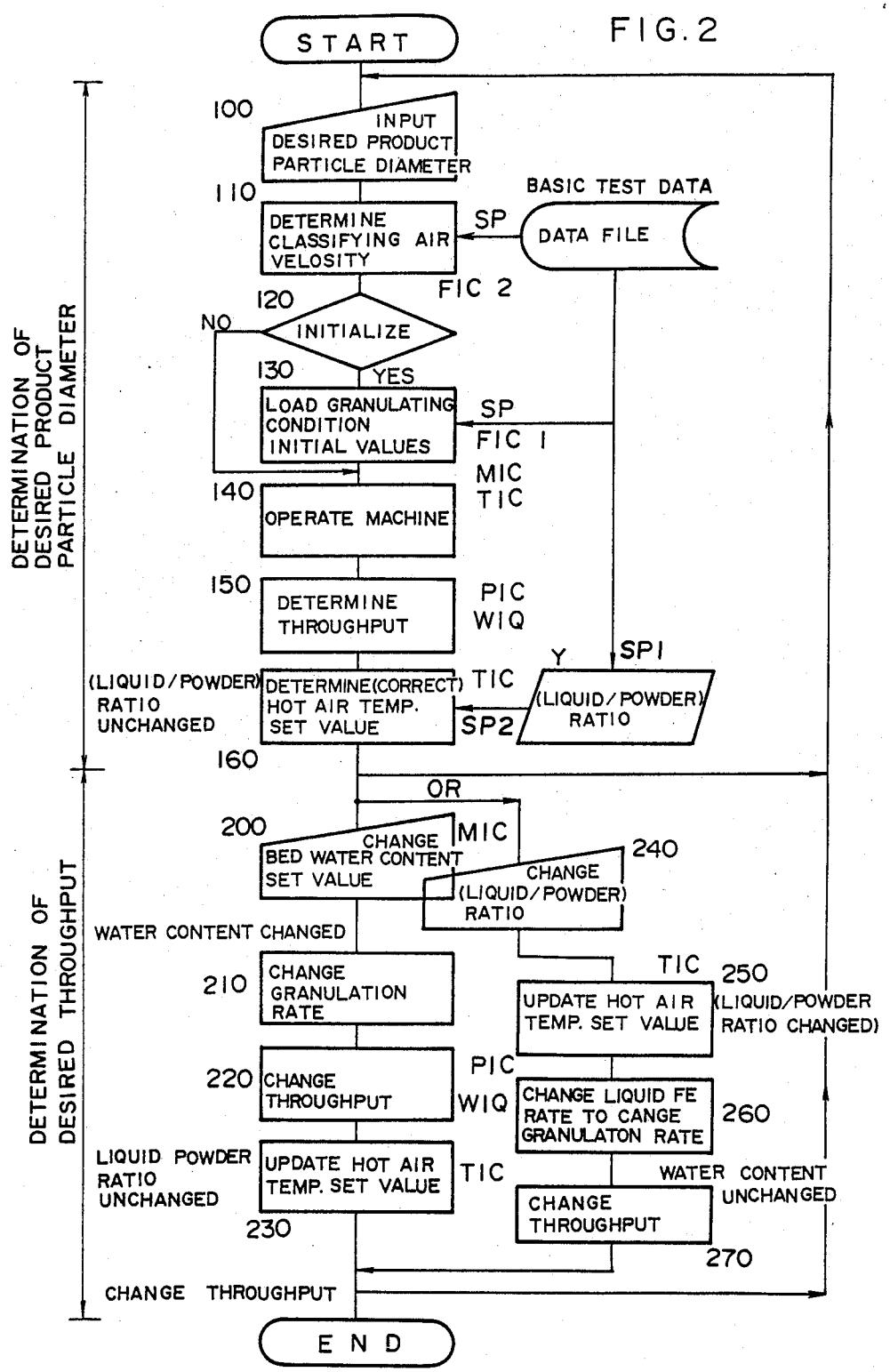

CONTINUOUS FLUIDIZED-BED GRANULATING APPARATUS

BACKGROUND OF THE INVENTION

1. Field of the Invention

The present invention relates to a continuous fluidized bed granulating apparatus for continuously producing a granulated product by continuously supplying a powder material such as powdered chemical, food, industrial material, fertilizer or animal feed into a fluidized bed to fluidize it and spray adding a suitable binding agent, (any additive may sometime be contained).

2. Description of the Prior Art

Continuous fluidized-bed granulating apparatus of the type in which a granulated product is continuously introduced in a substantially constant amount at a time into a classifying section from the bottom or bottom side wall of a fluidizing chamber and the granulated product is classified by classifying means thereby selecting and delivering the granules granulated to particle sizes greater than the desired size and returning ungranulated material to the fluidizing chamber, are themselves well known in the art as disclosed for example in U.S. Pat. No. 3,880,968. However, the conventional continuous fluidizing bed granulating apparatus of this type is so designed that the charging rate of a powder material to be granulated, binding liquid feed rate, hot air temperature, etc. are determined by experiments or instinct or alternatively they are separately subjected to constant value controls in accordance with preset values based on the results of granulation tests effected preliminarity on a pilot plant. Also, it is the usual practice to maintain the charged quantity constant so that the pressure drop of the fluidized bed is detected and the rate of delivery is adjusted so as to maintain the pressure drop at a set value thereby controlling such that the amount of retention or the average retention time of the powder material to be granulated in the fluidized bed is maintained constant, and also the granulated material introduced into the classifying section from the lower part or lower side wall of the fluidizing chamber is divided into a product and fine powder smaller than a given particle size by classifying means arranged at the delivery side of fluidized bed, and the fine powder is usually returned into the raw material (the powder material to be granulated).

The above-mentioned conventional continuous fluidized-bed granulating apparatus has the following disadvantages.

(1) Even if the constant value control loops provided for the respective process variables are controlled at the predetermined set values, the moisture content of the fluidized bed is varied by such disturbances due to the variations in the moisture content and particle size of a charged powder material to be granulated as well as the variation of the heat dissipation loss due to outside air temperature changes, the variation in the evaporation rate due to outside air humidity changes and this causes variations in the rate of granulation, the bulk density of product, the state of fluidization, etc., which are closely related to the bed moisture content thereby deteriorating the quality of the product and the operational stability.

(2) When it is desired to change the particle size, bulk density or throughput of product, it is necessary to reestablish the set values of the control loops predetermined separately for the respective process variables such as the hot air temperature, fluidizing air velocity, binding liquid feed rate, etc., and therefore to change the operating conditions requires extremely complicated operations, such as, preliminarily determining their correlations in terms of trial values by granulation experiments, experientially determining set values to make readjustments on the basis of the results of such set values and so on.

(3) Where the liquid/powder ratio must be regulated from the quality or formulation of product point of view, the amount of the under sieve classified by the classifying means, i.e., the amount of fine particles smaller than a given particle size varies at all times and they are returned and mixed with the raw powder material to be granulated, thereby making it impossible to ensure that the liquid/powder ratio be maintained at the specified value.

SUMMARY OF THE INVENTION

It is a first object of the present invention to provide a continuous fluidized-bed granulating apparatus so designed that a classification particle size of classifying means is set in accordance with the desired particle size and also the moisture content of the fluidizing particles during its granulation which is closely related to the rate of granulation, the state of fluidization, the bulk density of product, etc., is directly detected and controlled, thus automatically adjusting various process variables to satisfy the corresponding predetermined operational conditions and thereby manufacturing a product of the desired quality through the stable operation without relying on the operator's instinct, etc.

It is a second object of the invention to provide a continuous fluidized-bed granulating apparatus so designed that even if the liquid/powder ratio is particulary regulated from the product quality or formulation point of view, not only the first object of the invention is met but also the liquid/powder ratio is adjustable or the ratio is controlled at a constant value, thereby separately and sophisticatedly adjusting the various conditions for the product quality.

The other objects and features of the invention will become apparent from the following description of its embodiment taken in conjunction with the accompanying drawings.

To accomplish the first object, in accordance with the invention there is thus provided a continuous fluidized bed granulating apparatus of the type in which a granulated product is continuously introduced in a substantially constant amount at a time into a classifying section through the bottom or bottom side wall of a fluidizing chamber and then the granulated product is classified by classifying means such that the granulated material greater than the desired particle size is selected and delivered and also the ungranulated material is returned to the fluidizing chamber, and the granulating apparatus includes means for detecting the pressure drop of the fluidized bed in the fluidizing chamber, means for adjusting the amount of a charged powder material to be granulated in accordance with the deviation between the detected value of the pressure drop and a set value, means for detecting the moisture content of the fluidizing material to be granulated in the fluidizing chamber, and means for adjusting the feed rate of a binding liquid in accordance with the deviation between the moisture content detected value and a set value. This is hereinafter referred to as a first embodiment of the invention.

Then, to accomplish the second embodiment, in accordance with the invention there is provided such continuous fluidized bed granulating apparatus further including means for integrating the charging rate of the powder material to be granulated and the feed rate of the binding liquid, means for computing the ratio between these integrated values (the liquid/powder ratio), and means for adjusting the amount of heat supplied to the fluidized bed in accordance with the deviation between the output value of the ratio computing means and a predetermined set value. This is hereinafter referred to as a second embodiment.

In accordance with a preferred form of these embodiments, classifying means utilizing an air force to arbitrarily preset the desired classification particle size of a granulated product is arranged at the exit side of the fluidizing chamber.

In accordance with another preferred form of these embodiments, it is convenient to use a noncontact infrared absorption-type moisture analyzer as the moisture content detection means.

In accordance with still another form of the second embodiment, means is provided which cascade controls the temperature of hot air supplied to the fluidized-bed in accordance with the deviation between the output signal from the liquid/powder ratio computing means and a set value.

It is to be noted that of the various factors relating to the quality of product, those which are presettable include mesh size of the classifying means, moisture content of the particles during granulation which are closely related to and serving as indications for controlling the bulk density of product and the production yield of the classifying means, the liquid/powder ratio determined from the product formula point of view, etc. In addition, the moisture content of the particles during the granulation is also important as an indication for controlling the rate of granulation and the state of fluidization. While these operational factors do not separately act on the product but affect one another to act on the whole to produce a single operating condition. The granulating apparatus of this invention is possible to be preset these factors separately in order to produce the corresponding product and in this case the apparatus is operated with the throughput, etc., is determined automatically. In other words, in accordance with the first embodiment the desired product can be produced by setting the particle size of the product and the moisture content of particles during the granulation, and in accordance with the second embodiment it can be produced by setting the liquid/powder ratio determined from the standpoint of the product formulation in addition to the particle size of the product and the moisture content of particles during the granulation. In addition, it is extremely easy to change the preset conditions to adjust the product quality.

Further, in accordance with the first embodiment, the pressure drop of the fluidized bed is detected to control the charging amount of a powder material to be granulated with the result that the powder material to be granulated is automatically charged into the bed in an amount corresponding to the amount of discharged product in accordance with the rate of granulation determined by the preset conditions and the amount of the powder material to be granulated in the fluidized bed is always maintained constant. Still further, since the moisture content of the powder material to be granulated in the bed is detected so that the feed rate of the binding liquid is adjusted to control the moisture content at the set value, it is possible to correct any disturbances due to variations in the moisture content of the charged powder material, variations in the external air conditions, variations in the heat dissipation, etc. On the other hand, to maintain the moisture content of the powder material in the bed at a certain value may be said to means that the discharge rate of the liquid (mainly the water evaporation rate) is balanced with the feed rate of the binding liquid to be added, and thus in accordance with the second embodiment the amount of heat supply is cascade controlled to vary the evaporation capacity, so that the integrated ratio between the charging rate of the powder material to be granulated and the feed rate of the binding agent results in a predetermined liquid/powder ratio and thus the liquid/powder ratio is maintained at a predetermined value.

By virtue of the foregoing constructions of the invention, the following effects can be produced.

(1) Since the moisture content in the bed is controlled during the granulation, the rate of granulation and the product quality, e.g., the product bulk density are stabilized and the yield of the product passed through the classifying means is stabilized.

(2) By changing the set value of the bed moisture content controlling mechanism, the throughput capacity and the product bulk density can be adjusted.

(3) When any one of the operational factors is changed, the self regulation comes into action, so that the other factors are automatically adjusted correspondingly to attain a balanced condition, therefore an easy operation is performed.

(4) Particularly, the second embodiment can even ensure any liquid/powder ratio that meets the requirement.

(5) In addition, the particle size of the separated granules or the particle size of a product can be adjusted by simply controlling the classifying means.

(6) Further, by changing the set value of the moisture content in the bed or the liquid/powder ratio but without changing the particle diameter of the separated granules, the corresponding throughput can be attained automatically.

DESCRIPTION OF THE DRAWINGS

FIG. 2 is a flow chart for explaining the operation of the invention.

DESCRIPTION OF THE PREFERRED EMBODIMENTS

Figure 1:
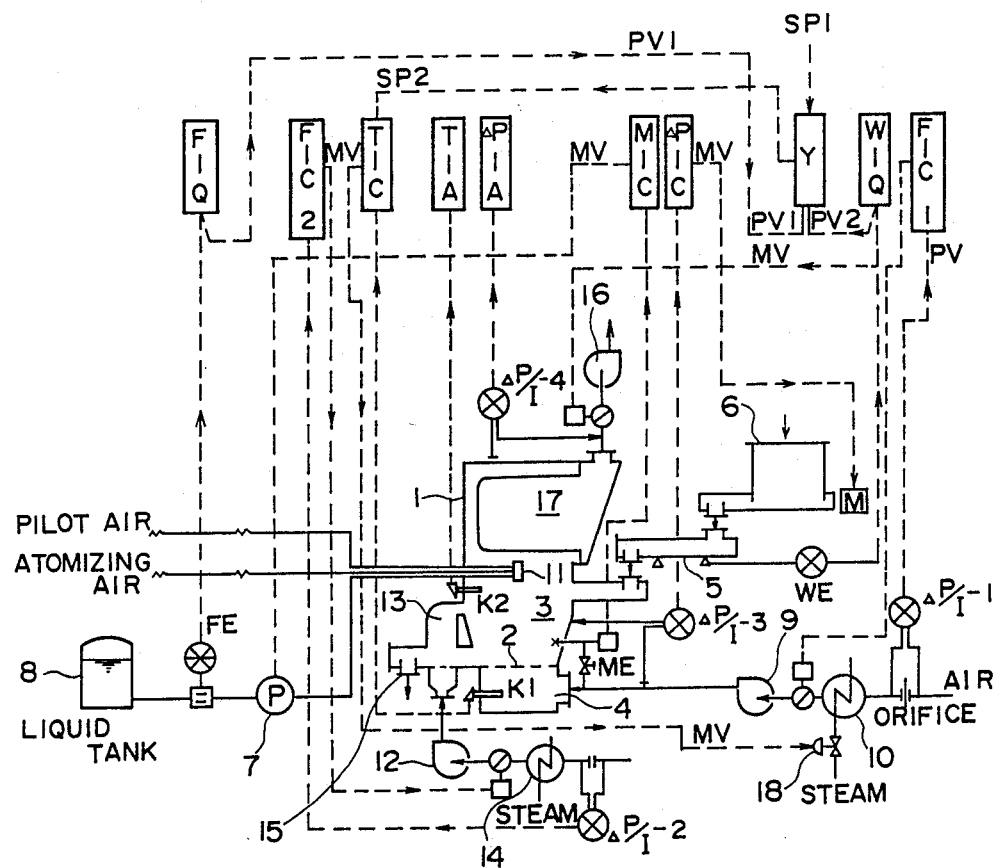
FIG. 1 is a schematic diagram showing the overall construction of a continuous fluidized-bed granulating apparatus according to an embodiment of the present invention.

An embodiment of the present invention will now be described with reference to the drawings. FIG. 1 is a schematic diagram showing the overall construction of a continuous fluidized-bed granulating apparatus according to the embodiment of the invention. In the Figure, numeral 1 designates a fluidized bed proper including a fluidizing chamber 3 in its upper part and a hot air chamber 4 in its lower part, and the two chambers are separated by a distribution plate 2. Numeral 5 designates a weighing conveyor whereby the amount of a powder material which is to be continuously charged for granulation into the fluidizing chamber 3 is measured by a weight detector WE and the measured value is transmitted to a charged amount indicating integrator WIQ. Numeral 6 designates a raw material feeder for adjusting the measured amount of the powder material to be loaded on the weighing conveyor 5, whereby the fluidizing air pressure drop of the fluidized bed or the differential pressure between the fluidizing chamber 3 and the hot air chamber 4 is detected by a differential pressure transmitter ΔP/I-3 so that in accordance with the deviation between the detected value and a set value, a control end M is operated in response to a control output MV from a bed differential pressure indicator controller ΔPIC., thereby always controlling constant the amount of the powder material to be granulated within the fluidizing chamber 3. Numeral 7 designates a binding liquid feed pump of a variable speed type which supplies the binding liquid from a liquid tank 8 into the fluidizing chamber 3 and it functions for example in a manner that the moisture content of the powder material during the granulation is detected by a fluidized bed moisture content detector ME comprising for example a noncontact-type infrared absorption moisture analyzer so that in accordance with the deviation between the detected value and a set value the pump is operated in response to the control signal MV from a bed moisture content indicating controller MIC and the moisture content of the powder material during the granulation is adjusted to the set value. Numeral 9 designates a fluidizing air blast fan for supplying the temperature-adjusted air from a heat exchanger 10 into the hot air chamber 4. This amount of air flow is detected by a differential pressure transmitter ΔP/I-1 and transmitted to a fluidizing air flow indicating controller FIC-1. In accordance with the deviation between the detected value and a set value, the air flow and the opening of an exhaust damper are controlled to attain a given air flow rate. Also the air blown into the hot air chamber 4 is blown up through the distribution plate 2 into the fluidizing chamber 3 so as to cause a swirling air stream and thereby fluidize the powder material to be granulated within the fluidizing chamber 3. Numeral 11 designates a binding liquid spraying nozzle for atomizing the binding liquid with an atomizing air and spraying it into the fluidizing chamber 3. Numeral 12 designates a classifying air blast fan, and a classifying chamber 13 is formed in the intermediary portion of the granulated product delivery section provided in the bottom side wall of the fluidizing chamber 3 and the temperature-adjusted classifying air from a heat exchange 14 is blown into the classifying chamber 13. Also, this air flow rate is detected by a differential pressure transmitter ΔP/I-2 and transmitted to a classifying air flow indicating controller FIC-2, thereby controlling the air flow rate in accordance with its control signal MV corresponding to the deviation between the detected value and a set value. After the classification by the classifying chamber 13, the ungranulated material of particle sizes smaller than a predetermined minus sieve particle size is automatically returned to the fluidizing chamber 3 and only the product greater than the given particle size is selectively draw out from a delivery port 15. Numeral 16 designates an exhaust fan for exhausting the fluidizing and classifying air to the outside of the machine through a back filter 17 arranged in the upper part of the fluidizing chamber 3.

It is to be noted that the flow rate of the binding liquid sprayed from the binding liquid spraying nozzle 11 is detected by a binding liquid flow rate detector FE comprising for example an electromagnetic flow meter or the like so that the detected value is transmitted to a binding liquid indicating integrator FIQ whose integrated value output is applied as a process variable PV1 to a liquid/powder ratio computing controller Y. Another process variable applied to the liquid/powder ratio computing controller Y is the integrated output PV2 of the charged amount indicating integrator WIQ which receives the detected value of the weight detector WE of the weighing conveyor 5, and the resulting computed value from these input values or an output obtained from the ratio between the feed rate of the binding liquid and the charged amount of the powder material to be granulated and a predetermined liquid powder ratio set value SP1 is applied as a preset value SP2 to a hot air temperature indicating controller TIC which receives the detected value of an internal temperature detector K1 in the hot air chamber 4 thereby effecting the cascade control and the resulting control signal MV operates a regulating valve 18 to adjust the flow rate of steam supplied to the heat exchanger 10.

On the other hand, the value detected by a temperature detector K2 inside the fluidizing chamber 3 is applied to a fluidizing bed temperature indicating alarm TIA and the upper limit of the control signal from the hot air temperature indicating controller TIC is limited in such a manner that the bed inner temperature becomes less than a predetermined temperature determined by the allowable temperature of the product. Also, the value detected by a differential pressure transmitter ΔP/I-4 of the back filter 17 arranged on the top of the granulating machine, is applied to a back filter differential pressure indicating alarm ΔPIA so that when the value is greater or less than a predetermined value, an alarm is issued to demand the cleaning or inspection of the back filter 17.

With the construction described above, the operation of the continuous fluidized-bed granulating apparatus according to the invention will now be described with reference to FIG. 1 and the flow chart of FIG. 2.

In FIG. 2, the flow chart is roughly divided into two procedures, i.e., one for determining the desired product particle diameter and another for changing the throughput. In accordance with the procedure for determining the desired product particle diameter, the desired product particle diameter is first inputted at a step 100 so that in accordance with this input value and basic test data stored in a data file, a classifying air velocity is determined as a set value for the classifying air flow indicating controller FIC-2 of FIG. 1 at a step 110. Then, it is determined whether the inputting of initial values is required at a step 120 so that if it is necessary to do so as during the operation starting period, for example, in accordance with the basic test data the respective granulating conditions for the fluidizing air flow indicating controller FIC-1, the bed moisture content indicating controller MIC and the hot air temperature indicating controller TIC of FIG. 1 are determined temporarily at a step 130 and the operation of the granulating machine is started at a step 140. In accordance with the granulating rate under these set conditions, a powder material to be granulated is charged in an amount corresponding to a discharged product rate and this charged amount is measured to determine a throughout at a step 150. On the basis of this throughput, at a step 160 a liquid/powder integrated ratio is determined by the liquid/powder ratio computing controller Y of FIG. 1 so that a control signal corresponding to the deviation between the computed ratio and a predetermined set value SP1 is outputted as a set value SP2 of the hot air temperature indicating controller TIC to cascade control the hot air temperature and thereby to attain the preset value SP1. The hot air temperature indicating controller TIC operates the regulating valve 18 in accordance with the deviation so that the temperature of the hot air supplied from the fluidizing air blast fan 9 is controlled to vary the evaporating capacity, whereas the powder material within the fluidizing chamber is adjusted at a predetermined moisture content value by the bed moisture content indicating controller MIC, thereby a spray liquid rate is equivalent to an evaporation capacity. Consequently, the liquid feed rate is controlled and the ratio computing controller Y maintains the predetermined liquid/powder ratio SP1.

Then, the steps following the step 160 represent the flow chart for changing the granulation throughput to a desired value while maintaining the previously determined product particle diameter and the liquid/powder ratio. More specifically, a step 200 changes the set value of the moisture content within the fluidized bed which is detected by the fluidized bed moisture content detector ME in the bed moisture content indicating controller MIC of FIG. 1 and the granulation rate is changed according to the change of the moisture content at a step 210. Then, the detected value from the weighing conveyor 5 is confirmed by the charged amount indicating integrator WIQ at a step 220, and in order to update the output PV2 of the charged amount indicating integrator WIQ and maintain the liquid/powder integrated ratio of the liquid/powder ratio computing controller Y at the set value SP1, the cascade control set value SP2 of the hot air temperature indicating controller TIC is updated by the same procedure as mentioned previously at a step 230, thereby forming a control loop for operating the regulating valve 18 in accordance with the control value MV from the hot air temperature indicating controller TIC.

On the other hand, when the liquid/powder ratio is to be changed a transfer is made from the step 160 to a step 240 where the liquid/powder ratio set value SP1 of the liquid/powder ratio computing controller Y of FIG. 1 is changed, and thus the hot air temperature set value SP2 of the hot air temperature indicating controller TIC is changed at a step 250. Then, in response to the change in the opening of the regulating valve 18 caused by the changed control output of the hot air temperature indicating controller TIC, the heat quantity supplied to the fluidized bed is changed to adjust the vaporization capacity so that in accordance with a change in the control output MV of the bed water content indicating controller MIC the liquid feed rate of the binding liquid feed pump 7 is adjusted and the granulation rate is correspondingly set to a new value at a step 260.

On the other hand, even if the granulation rate has been changed by the above-mentioned procedure, the bed retention amount is always maintained constant by the bed differential pressure indicating controller ΔPIC and also the amount of charge is automatically changed in correspondence to the changed granulation rate.

From the foregoing description it will be seen that the granulating apparatus of this invention is such that by predetermining the desired classifying air speed, product particle size, powder material water content in fluidized bed, liquid/powder ratio, etc., it is possible to easily produce a product of any desired quality and that the quality can be very easily changed by simply changing such set values. In addition, the differential pressure within the fluidized bed is controlled so that in accordance with the granulation rate determined by these preset condition a powder material to be granulated is charged into the bed in an amount corresponding to the discharged product rate while maintaining the retention amount constant, thereby automatically adjusting the throughput. The throughput can be varied by simply changing the set value of the moisture content indicating controller while maintaining the product particle diameter and the liquid/powder ratio as such.

These control loops operate in association with one another and, as a whole, they maintain the desired separated granule particle diameter and liquid/powder ratio properly. Thus, even if a disturbance occurs, the throughput is automatically adjusted in response to the disturbance, whereas when the desired separated granule particle diameter of the product is changed, in accordance with the detected value of the differential pressure transmitter ΔP/I-3 the throughput is automatically controlled at a value corresponding to the separated granule particle diameter after its change while maintaining constant the retention amount in the bed.

Also, where it is desired to change only the throughput without changing the separated granule particle diameter, it has been known by experiments that by increasing for example the set value of the bed moisture content indicating controller MIC to maintain the water content in the fluidized bed at a high level, the granulation rate is increased and consequently the throughput is increased.

On the other hand, where there is no particular limitation to the liquid/powder ratio, the degrees of freedom among the operational conditions are increased by 1. The first embodiment corresponds to this case so that as for example, the cascade control of the hot air temperature in accordance with the computation of the liquid/powder ratio may be eliminated and in this case the hot air temperature may be selected freely.

Further, while the above embodiments show the cases where the hot air temperature is adjusted as a typical means of controlling the amount of heat supplied in accordance with the control output SP2 of the liquid/powder ratio computing controller Y, although it is difficult to considerably vary the fluidizing air velocity due to the fluidizing bed type, the same effects as the above-described embodiment can be produced by adjusting the amount of heat through the control of the rate of air flow of the blast fan 9 or by arranging a separate heating means such as a heat conduction pipe within the fluidizing bed.

I claim:

1. In a continuous fluidized-bed granulating apparatus in which a granulated product is continuously introduced in a substantially constant amount at a time into a classifying section through a lower wall of a fluidizing chamber whereby the granulated product is classified by classifying means so that granules granulated to particle sizes greater than a desired size are selected and delivered and ungranulated powder is returned to said fluidizing chamber, the improvement comprising:
   means for detecting a fluidizing air pressure drop of a fluidizing bed within said fluidizing chamber;
   means for adjusting a charging rate of a material to be granulated in accordance with a deviation between a detected value of said pressure drop and a set value;

means for detecting a moisture content of the material to be granulated in said fluidizing chamber; and means for adjusting a feed rate of a binding liquid in accordance with a deviation between said moisture content detected value and a set value.

2. An apparatus according to claim 1, further comprising:

means for integrating the charging rate of said material to be granulated and the feed rate of said binding liquid;

means for computing a liquid/powder ratio between said integrated values; and means for adjusting an amount of heat supplied to said fluidized bed in accordance with a deviation between an output value of said ratio computing means and a predetermined set value.

3. An apparatus according to claim 2, further comprising means for cascade controlling the temperature of hot air supplied to said fluidized bed in accordance with a deviation between an output signal from said liquid/powder ratio computing means and a set value.

4. An apparatus according to claim 1, wherein said classifying means arranged at an exit side of said fluidizing chamber is capable of freely setting a classification particle size of a granulated product and is adapted to be operated by an air force.

5. An apparatus according to claim 1, wherein said moisture content detecting means is an infrared absorption-type moisture analyzer.

* * * * *